United States Patent [19]

Fulghum et al.

[11] Patent Number: 5,317,593

[45] Date of Patent: May 31, 1994

[54] COMMUNICATION DEVICE WITH CODE SEQUENCE AND FREQUENCY SELECTION SYSTEM

[75] Inventors: Tracy L. Fulghum; Edward K. B. Lee, both of Sunrise; Jimmy W. Cadd, Coral Springs, all of Fla.

[73] Assignee: Motorola, Inc., Schaumburg, Ill.

[21] Appl. No.: 25,494

[22] Filed: Mar. 3, 1993

[51] Int. Cl.⁵ .............................................. H04K 1/00
[52] U.S. Cl. .......................................... 375/1; 380/34
[58] Field of Search .............................. 375/1; 380/34

[56] References Cited

U.S. PATENT DOCUMENTS

| | | | |
|---|---|---|---|
| 4,979,183 | 12/1990 | Cowart | 375/1 |
| 5,029,180 | 7/1991 | Cowart | 375/1 |
| 5,210,771 | 5/1993 | Schaeffer et al. | 375/1 |
| 5,237,587 | 8/1993 | Schoolcraft | 375/1 |

OTHER PUBLICATIONS

Theory of Spread-Spectrum Communication by Raymond L. Pickholtz, Donald L. Schilling, and Laurence B. Milstein, published in IEEE Transaction on Communication, vol. Com-30, No. 5, May 1982.
Crosscorrelation Properties of Pseudorandom and Related Sequences, by Dilip V. Sarwate and Michael B. Pursley, published in Proceedings of the IEEE, vol. 68, No. 5, May 1980.

Primary Examiner—Tod R. Swann
Attorney, Agent, or Firm—M. Mansour Ghomeshi

[57] ABSTRACT

A code division multiple access (CDMA) communication system (10) for reuse of available spreading codes includes a first communication device (100) and a second communication device (106). The first and second communication devices (100, 106) are capable of identifying spreading codes and operating frequencies that are optimum for their respective radios. The identity of the optimum spreading code and the frequency of the optimum frequency is communicated from one communication device (100) to another (106), hence allowing the two devices to communicate with each other using their respective optimum codes and frequencies. These codes and frequencies may be periodically updated to provide reusability of codes. By dynamically updating codes and frequencies without the use of a central station, the efficiency and reusability of codes in the CDMA system (10) is significantly enhanced.

24 Claims, 4 Drawing Sheets

COMMUNICATION DEVICE WITH CODE SEQUENCE AND FREQUENCY SELECTION SYSTEM

TECHNICAL FIELD

This invention relates in general to communication devices and more particularly to code division multiple access (CDMA) communication devices.

BACKGROUND OF THE INVENTION

In direct sequence Code Division Multiple Access (CDMA) systems, many transmitters may operate in a wide but same frequency space. The signals are discriminated at the receiver by the difference in their pseudo-random spreading sequences or codes. However, recovery of signals in the presence of a strong signal is almost impossible regardless of the spreading code used. This creates a problem commonly known as the near-far problem. The Receiver is incapable of receiving a signal when a strong signal is present on the same frequency. Such a condition significantly hampers the operation of the CDMA system until the strong signal disappears. It is therefore desired to have a CDMA system that allows communication between radios even in the presence of strong signals.

SUMMARY OF THE INVENTION

Briefly, according to the invention, a code division multiple access (CDMA) communication system for reuse of available spreading codes is disclosed. The system includes a control spreading code and a control frequency to provide communication between the various communication devices. A first communication device transmits a signal having the control frequency and spread by the control spreading code. This signal includes a request for an optimum spreading code and an optimum operating frequency from a second communication device. The second communication device includes a receiver which receives a signal and proceeds to identify a first optimum operating frequency the second communication device also includes a means for identifying a first spreading code optimum for the reception of signals. A transmitter transmits the identity of the first spreading code and the optimum operating frequency to the first communication device. After this hand shake, the first and second communication device operate using optimum frequency and optimum spreading codes. In other aspects of the present invention, the first communication device identifies operating frequencies and operating codes optimum for its conditions and communicates the identify of the codes and the frequency to the second communication device so that communication between the two devices could continue with codes and frequencies that are optimum for each of the devices.

DETAILED DESCRIPTION OF THE PREFERRED EMBODIMENT

Figure 1:
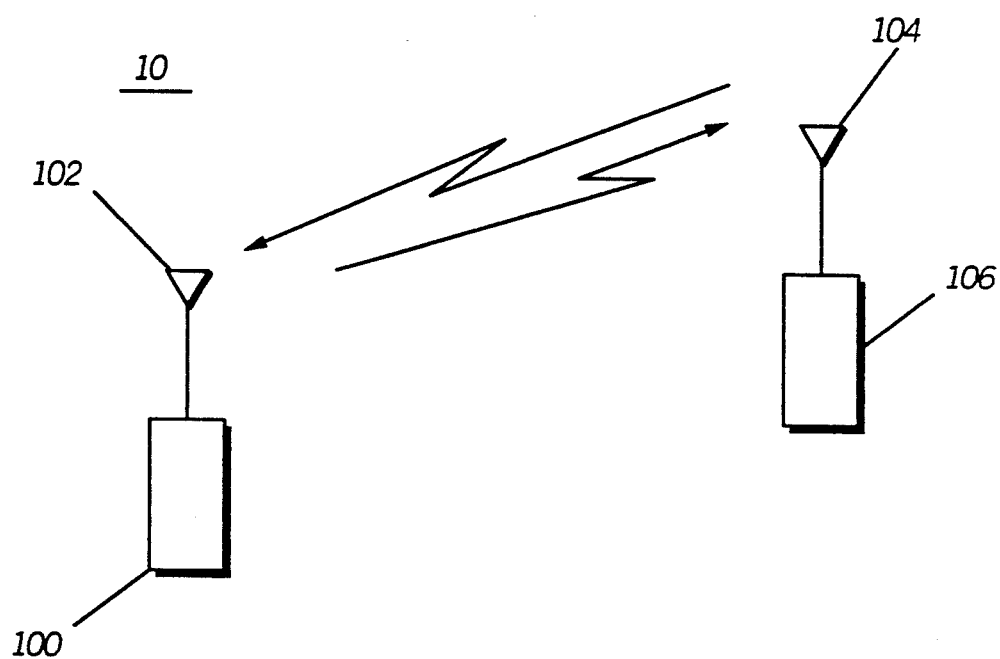
FIG. 1 is a communication system in accordance with the present invention.

Referring to FIG. 1, a code division multiple access (CDMA) communication system 10 is shown in accordance with the present invention. A first communication device 100 includes an antenna 102 and a second communication device 106 includes an antenna 104. In the preferred embodiment the first communication device 100 is the initiator or the originator and the second communication device 106 is the target communication device. These communication devices communicate to each other using communication device frequency signals and spreading codes. The communication system 10 is preferably a Direct Sequence Code Division Multiple Access (DS-CDMA) communication system. As is known in the art, in such a system, many pairs of users may operate in the same frequency space and are separated from each other by using different pseudo-random spreading sequences or codes. It is the low cross-correlation aspect between the different spreading codes that allows the pairs of users to operate independently on the same frequency. An average measurement of the interference encountered between codes is mean square cross-correlation. Since the cross-correlation between the codes will depend on what time offset is between them the mean square cross-correlation is a better interference measurement. The mean square cross-correlation, r, can be evaluated by the following formula:

$$\rho^2 = \frac{1}{N} \sum_{k=0}^{N-1} (r(\tau_k))^2$$

where:

$$r(\tau_k) = \int_0^{NT} c_1(t)c_2(t + \tau_k)dt$$

N = Sequence Length
t = chip duration
tk = Kth offset
$C_m$(t) = $M^{th}$ code sequence Different pairings of codes (Gold codes for example will have different mean square cross-correlation values. This means how much another communicator interferes with your particular communication depends on which code it uses, and how the pairing with the code used cross-correlates. Basically by measuring the mean square cross-correlation between a code and what is on the channel, one can get a measure of how much this particular code will be interfered with in a subsequent communication, and which codes are being used in the system.

In the present invention, the first communication device 100 transmits a signal spread by a control code, this signal includes a request for an optimum spreading code and an optimum operating frequency. The second communication device 106 receives this signal and recovers its contents using the known control code and the known control frequency. It is noted that this control code and the control frequency are common for all communication devices in the communication system 10. Therefore, communication devices such as 100 and 106 are aware that each signal must be cross-correlated with the control code to determine if the signal contains control information, such as the one transmitted by the first communication device 100 requesting an optimum spreading code and optimum frequency.

The signal, after being received by the second communication device 106, is decoded and the request for optimum spreading code and operating frequency is acted upon. The communication device 106 proceeds to identify an optimum spreading code and an optimum frequency on which it wishes to receive signals. The identity of this spreading code and the frequency of the optimum frequency are then transmitted to the communication device 100, using preferably the control code and the control frequency. Henceforth, communication from the communication device 100 to the communication device 106 is conducted on the optimum operating frequency using this optimum spreading code.

In other aspects of the present invention, the signal communicated from the second communication device 106 indicating the optimum spreading code and the frequency of the optimum frequency includes a request for a code and frequency that is optimum for the first communication device 100. This is done so that the communication device 106 can determine the frequency and spreading code on which the communication device 100 wishes to receive signals. The communication device 100 determines the optimum spreading code and the optimum operating frequency and transmits their identity to the communication device 106 in its next communication. It can be seen that the first communication device 100 is now aware of the optimum spreading code and frequency that the second communication device 106 wishes to be communicated with. Similarly, the second communication device 106 is aware of the optimum spreading code and frequency that the first communication device 100 wishes to be communicated with. The communication between the two communication devices 100 and 106 will therefore continue using these optimum codes and frequencies.

In yet another aspect of the present invention, the communication between the first communication device 100 and the second communication device 106 may be periodically affixed by a request for an update of the optimum spreading code and frequency. This is desirable in applications where an update of the optimum code and frequency is needed due to varying conditions of the CDMA channel. Indeed, it may be desired that each communication device automatically and periodically search for the most optimum code and frequency and communicate them to the other communication device at the most opportune moment. Such a system would ensure optimum communication without additional solicitation of codes or frequencies.

In summary, it has been shown that communication devices operating in a CDMA environment can do so using optimum spreading codes and frequencies by allowing the communication units to request them before commencing communication. Therefore, a receiving unit determines optimum codes and frequencies for its environment and communicates them back to an originating unit. It is noted that various handshaking and protocols may be used in requesting and establishing the optimum codes and frequencies for each of the communication devices. A detailed description of these various handshakes and protocols is eliminated to avoid unnecessary verbosity.

Figure 2:
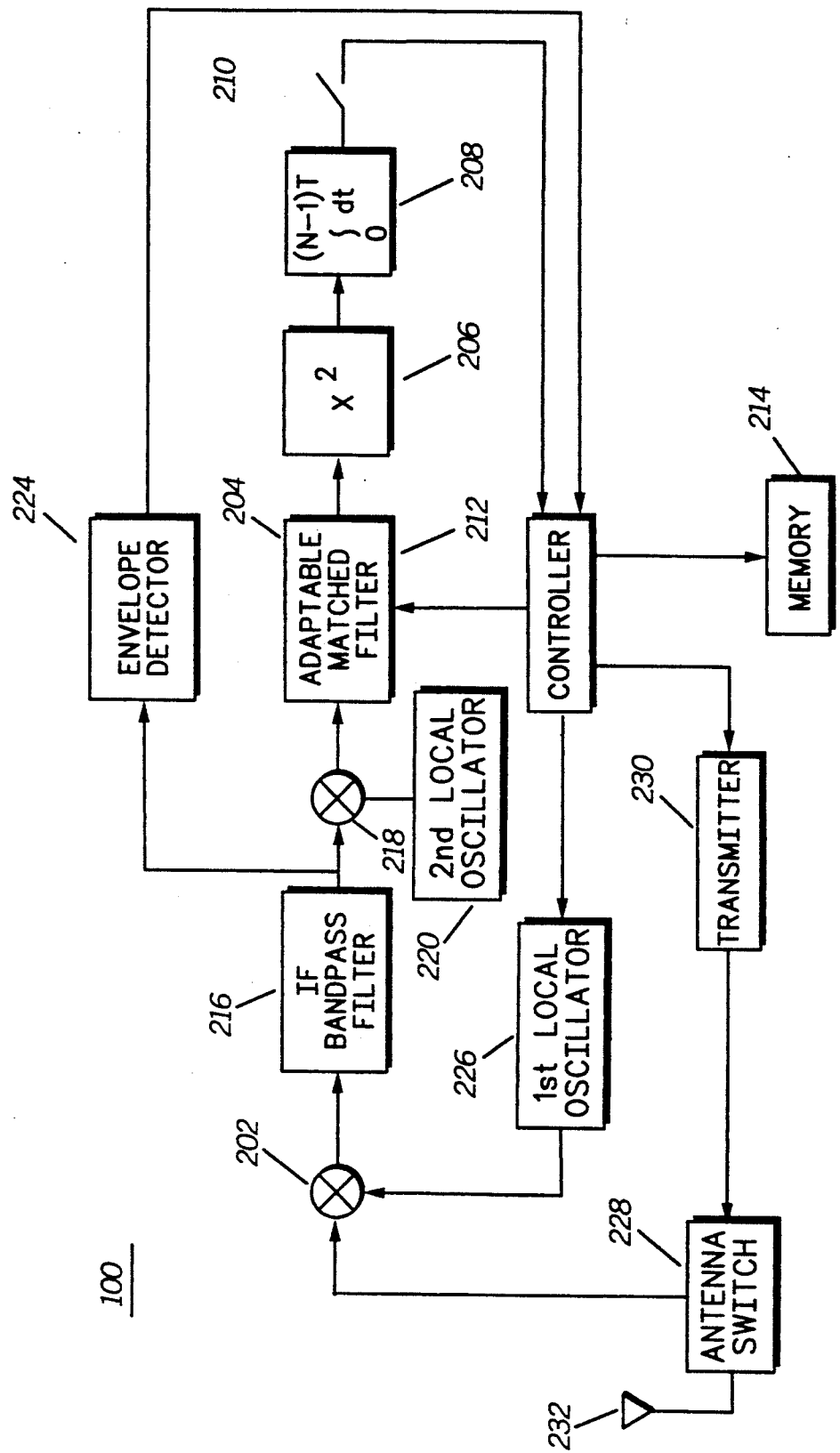
FIG. 2 is a block diagram of a communication device in accordance with the present invention.

Referring to FIG. 2, a block diagram of a radio communication device 100 is shown in accordance with the present invention. A signal received at the antenna 102 is coupled to an antenna switch 228 and mixed by a first local oscillator signal at a mixer 202. The first local oscillator signal is produced at a first local oscillator 226. The output of the mixer 202 is coupled to an IF bandpass filter 216 and applied to a second mixer 218 to be mixed with a second local oscillator signal. This signal is produced by the oscillator 220. The output of the IF bandpass filter 216 is also coupled to an envelope detector 224. The envelope detector 224 measures the envelope of the IF signal and provides the results to a controller 212. The baseband signal at the output of the mixer 218 is coupled to an adaptable matched filter 204. the adaptable matched filter 204 is set via the controller 212. The output of the filter 204 is coupled to square an integrate blocks 206 and 208 and then coupled to a sample and hold block 210. The sample and hold block 210 samples the output of the integrate 208 and holds that value and presents that value to the controller 212.

In essence, the controller 212 identifies optimum spreading codes and optimum operating frequencies for the communication device 100. To identify an optimum frequency, the controller 212 sets the operating frequency of the first local oscillator in order to evaluate that particular frequency. The envelope of the IF signal is measured via the envelope detector 224 and fed back to the controller 212. When this envelope is above a certain threshold, the controller 212 directs the local oscillator 226 to a next frequency. In the preferred embodiment, the quality of operating frequency is determined by evaluating the envelope of the IF signal. When this envelope falls below a certain threshold it is controlled by a controller 212, that signal is identified as an optimum frequency. With an optimum frequency defined, the controller 212 proceeds to identify optimum spreading codes within that frequency. For this, the controller 212 sets the adaptable matched filter 204 to a variety of codes that are stored in the memory 214. The signal at the output of the filter 204 is squared and integrated and applied to a sample and hold block 210. The value of the sampled signal is evaluated by the controller 212 and a decision is made as to whether this is an optimum code or not. When all the codes have been tested for this frequency, the controller 212 proceeds to combine the optimum operating frequency and the optimum codes in a message and presents that to a transmitter 230 for transmission. The output of the transmitter 230 is coupled to the antenna switch 228 which provides the coupling of the transmitter 230 to the antenna 102.

In other aspects of the present invention, the controller 212 proceeds to determine not just one operating frequency that is optimum for the device 100, but rather a number of optimum frequencies. To accomplish this, the routine described above to locate an operating frequency is repeated until all the operating frequencies for the communication device 100 have been tested. It is understood, that there may be a number of codes associated with each one of the operating frequencies. These may also be determined by the controller 212 using the procedure described above. All of these optimum codes and optimum frequencies may be communicated via the transmitter 230. It is further understood that the block diagram of the communication 100 as presented in FIG. 2 is one of many embodiment to provide similar functionalities. CDMA communication systems are well known in the art and the methods of identifying operating frequencies and operating codes is known in the art as well. One could use other communication devices to achieve the selection of optimum spreading codes and optimum operating frequencies without departing from the spirit of the present invention.

Figure 3:
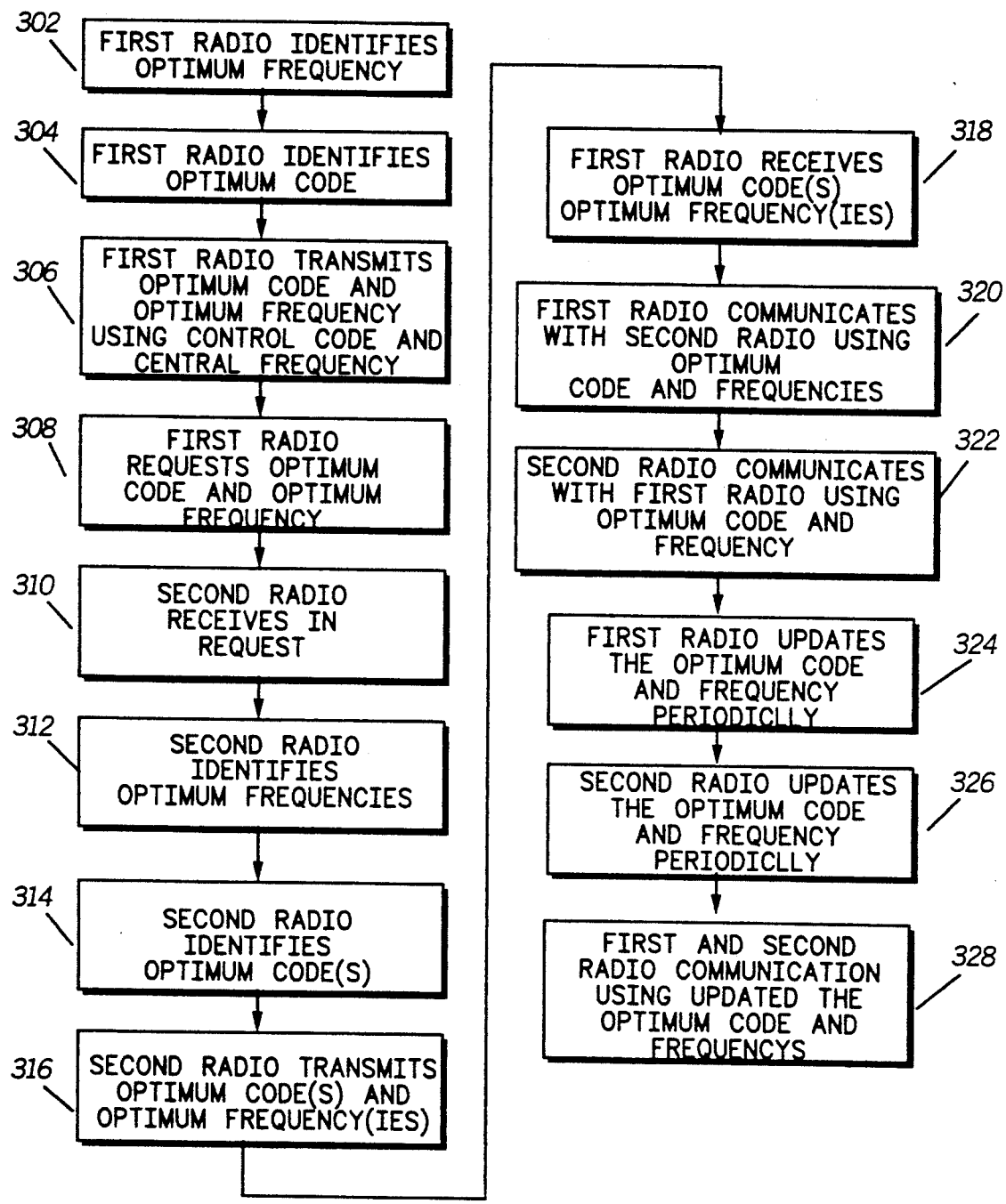
FIG. 3 shows a flow chart of the operation of the communicate system in accordance with the present invention.

Referring to FIG. 3, a flow chart of the operation of the communication system is shown in accordance with the present invention. From a start block 301, the first communication device 100 proceeds to identify optimum operating frequencies on which it wishes to receive signals, block 302. With optimum operating frequencies identified, the first communication device then proceeds to identify optimum spreading codes within those frequencies, via block 304. These optimum frequencies and optimum spreading codes are labeled second operating frequencies and second spreading codes. The first communication device then transmits the identity of the optimum spreading codes and the frequency of second optimum operating frequencies using control codes and control frequency, block 306. Along with the identity of these spreading codes and the optimum operating frequency, the first communication device sends a signal requesting from an identified second communication device spreading codes and operating frequencies that are optimum for the second communication device, block 308. This request is received at the second communication device, block 310. The second communication device proceeds to identify the optimum operating frequency, block 312. The second communication device further identifies optimum spreading code, via block 313. The operating frequency and spreading code identified by the second communication device are labeled, first spreading code and first operating frequency. The second communication device then transmits the optimum frequency and optimum code to the first communication device, block 314. The first radio receives the identity of the optimum code and the frequency of the optimum frequency, block 316. With the optimum codes and optimum frequency exchanged between the first and second communication devices, communication can proceed using these optimum parameters. At block 318, the first communication device communicates with the second communication device using the first optimum code and optimum frequency. At block 320, the second communication device communicates with the first communication device using these second optimum code and optimum frequency. Following this established communication, each communication device can periodically take time to update its optimum frequency and optimum codes. Block 322 and 324 provide this function for the first and second communication devices. Block 326, the first and second communication devices communicate with each other using updated codes and updated optimum frequencies.

In other aspects of the present invention, each communication device may select more than one optimum frequency and more than one optimum code for that frequency. Such a feature allows the receiving (target) communication device to choose which of those codes and frequencies are optimum for it's situation, rather than being dictated by the other (originating) communication device. This feature is useful in the simplest of operations where both communication devices operate on the same frequency. This allows the first communication device to identify its operating frequencies and optimum codes and the second communication device to choose from among these codes and frequencies.

In essence, the present invention provides for a two dimensional CDMA communication system which advances code reuse and diminishes the wiping out of weak signals. Instead of spreading a signal completely over a given frequency space, the frequency space may be divided into frequency channels. This means that the spreading of the signal processing gain must be reduced. In other words, rather than having one very wide bandwidth in a CDMA system, the bandwidth is divided to create a number of signals. Although, this reduces the processing gain, significant benefits may be realized as presented in the preferred embodiment. By giving up processing gain interference immunity one will have more frequencies available to retreat if a strong interfere is present on that one frequency. By allowing communication devices to locate optimum operating frequencies, the system has been afforded an opportunity to change frequencies to find a frequency space where there are a few users or where the users are far enough that their interference is negligible. If there are M frequencies and K available codes, then there are MxK code frequency combinations. If the number of channels, M, is increased, the available spreading bandwidth on each frequency channel is decreased. As the channel bandwidth decreases, so does K, the number of available codes, by a similar factor. Therefore the number of code/frequency combinations remains approximately the same no matter how the available bandwidth is divided.

It has been demonstrated that by dividing the available frequency spectrum into k number of channels, the number of available codes is increased by that same factor. In other words, if there are m number of codes, the number of codes/frequencies available for communication devices to communicate with each other is (m x K). It can be seen that it is no longer necessary for a communication device operating in a CDMA system to wait until a strong signal condition has disappeared before it can communicate with another communication device. Since the frequency spectrum is divided into a number of channels two communication devices could communicate on one channel without preventing others from utilizing channels in the CDMA system, thereby minimizing the near far problem presently experienced in CDMA systems. This combination code and frequency selected system would have better performance in a higher density of users. In other words by dividing up the frequency bandwidth into a number of channels more users can be accommodated without the impediment of being locked out by a strong signal condition.

Figure 4:
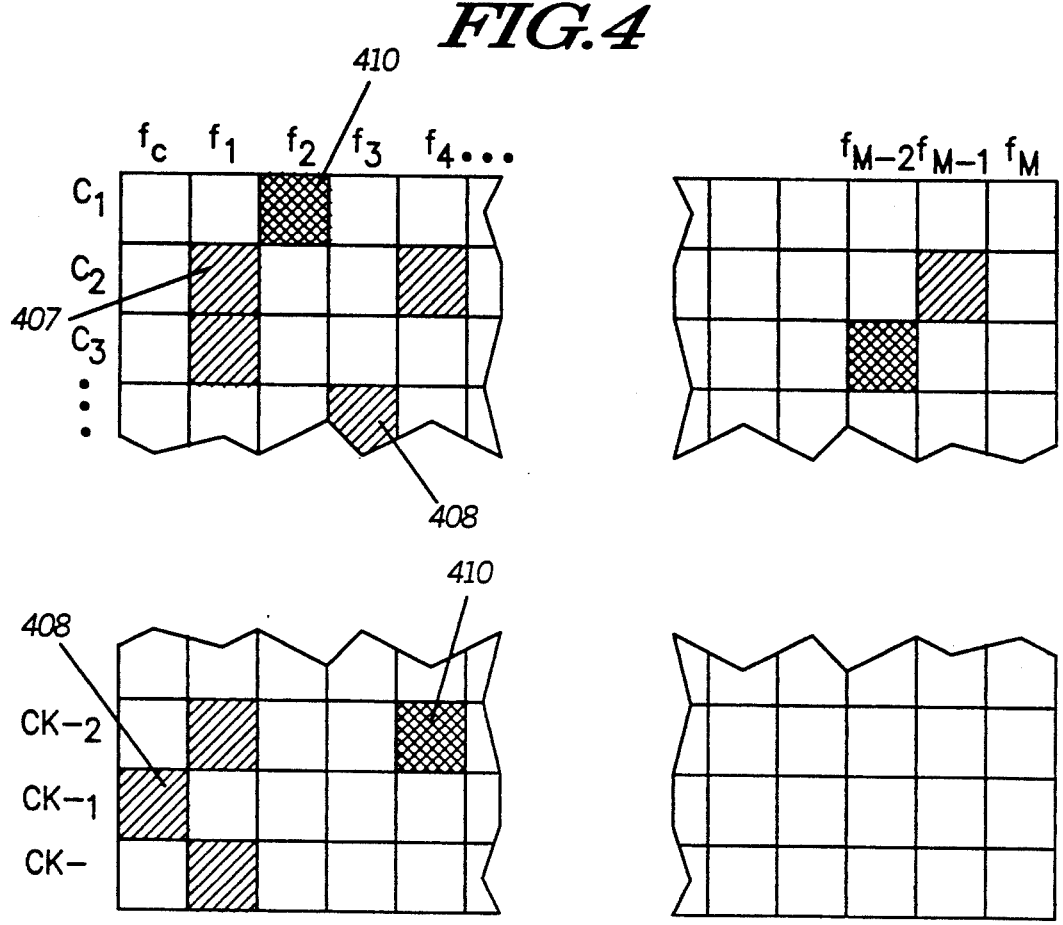
FIG. 4 shows the distribution of frequencies and codes in a communication system.
Figure 5:
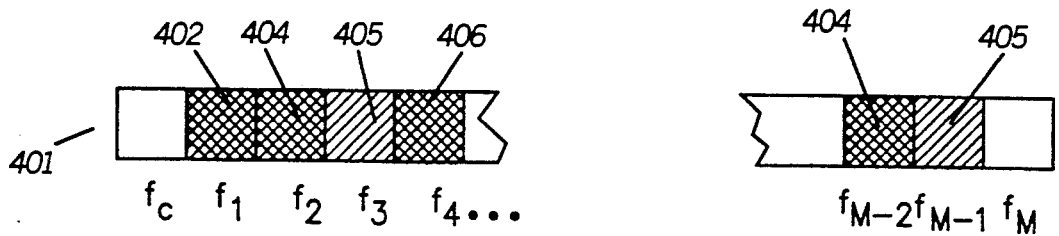
FIG. 5 shows the collective distribution of frequencies and codes in a communication system.

The two dimensional aspect of the present invention is better understood by referring to FIGS. 4 and 5. This figure shows a number of vertical and horizontal ocis where the vertical axis demonstrates the availability of codes and the horizontal axis demonstrates the availability of frequencies. Each block represents the energy out of a receiver at the frequency corresponding to the column with a filter matched to the code corresponding to the row. White blocks show the absence of any signal at a particular code/frequency combination. Single hatched blocks show the presence of a weak or moderate signal at a particular code frequency combination. Double hatched blocks show presence of a strong signal at a particular code frequency combination. Since there is some mutual interference between codes, the presence of a strong signal from any of the codes on that frequency channel could render that frequency useless to a receiver, no matter which of the remaining unused codes are picked for use. Similarly, the presence of multiple moderate signals could increase the total interference to a point where the frequency is unusable.

Row of blocks 401 in FIG. 5 shows the overall results of the density at various frequencies. Block 407 indicates that a weak signal coded with the spreading code $C_2$ is present on frequency $F_1$. It can be seen that on frequency Fl, the weak signal is present with the control codes $C_3$, $C_{K-2}$, and $C_K$. The summation of all of these weak signals on $F_1$ renders this frequency unusable and hence block 402 which is a double hatched block indicating the strong presence of signals on $F_1$ using a variety of codes. Block 410 shows the presence of a strong signal with the spreading code $C_1$ on $F_4$. The presence of this strong signal is enough to render frequency $F_2$ unusable, hence block 404. Block 408, indicates the presence of a weak signal with the spreading code $C_4$ on $F_3$, this results in block 405 which indicates that $F_3$ may accommodate more spreading codes. Similarly, blocks 402, 404, and 406 indicate the presence of strong signals on frequencies $F_2$, $F_4$, and $F_{M-2}$ and a weak signal on frequency $F_1$. In this example, block 405 indicates that frequencies $F_3$ and $F_{M-1}$ are optimum frequencies and white blocks under these frequencies are optimum spreading codes.

The usefulness of a particular frequency can be estimated by examining the energy in that frequency, rather than at each code/frequency combination. For example, multiple moderate energy users 407 on F1 will give a high energy reading on F1 overall 402. similarly, a single strong user on F2, 410, will give a high energy reading on F2 overall 404. In both of these cases, there is a high probability that the frequency is useless to the receiver. On the other hand , the measurement of F3 overall 405 shows moderate energy and the potential for usable codes at this frequency. Examination of the codes at this frequency with filters matched to those codes, would find the white blocks as available codes.

In summary, it has been demonstrated that in a CDMA system, communication devices could identify optimum operating frequencies and optimum spreading codes and then communicate them to other communication devices that wish to communicate with them. Utilizing this scheme, the usability and availability of frequencies and codes is significantly improved in a DS-CDMA. It is no longer necessary to allocated frequencies and codes to various communication devices in a communication system. These codes and these frequencies could be dynamically updated which would significantly improve the efficiency and the reusability of codes and frequencies. It is further noted that the teachings of the present invention eliminates the need for a control station to keep track of various codes and various frequencies. This is highly significant as a self-maintained system is born without permanent frequency and code allocations. A significant advantage of this system in addition to the code reuse, and efficient use of the spectrum, is the reduced probability of being totally wiped out or blocked out by a nearby interferer in a high density of users.

What is claimed is:

1. A Code Division Multiple Access (CDMA) communication system for reuse of available spreading codes, the system having a control spreading code and a control frequency and comprising:

a first communication device for transmitting a signal having the control frequency and spread by the control spreading code, the signal includes a request for an optimum spreading code and an optimum operating frequency;

a second communication device, including:
a receiver for receiving the signal;
first means for identifying a first operating frequency optimum for the second communication device;
second means for identifying a first spreading code optimum for the reception of signals by the second communication device; and
a transmitter for transmitting the identity of the first spreading code and the first optimum operating frequency to the first communication device;

whereby the first and second communication devices communicate using the first operating frequency and the first spreading code.

2. The communication system of claim 1, wherein the first and second communication devices include Direct Sequence Code Division Multiple Access (DSCDMA) communication devices.

3. The communication system of claim 1, wherein the second means for identifying identifies a plurality of spreading codes optimum for the reception of signals by the second communication 4. The communication system of claim 3, wherein the first communication device selects one of the plurality of spreading codes to communicate with the second communication device.

5. The communication system of claim 1, wherein the transmitter includes a controller for requesting a second spreading code that is optimum for the first communication device.

6. The communication system of claim 5, wherein the first communication device includes means for identifying a second spreading code optimum for the first communication device.

7. The communication system of claim 6, wherein the first communication device includes means for identifying a second operating frequency optimum for the first communication device.

8. The communication system of claim 7, wherein the first communication device includes a transmitter for transmitting the second spreading code and the second operating frequency.

9. The communication system of claim 1, wherein the first communication device includes means for periodically checking for optimum codes and communicating them to the second communication device.

10. The communication system of claim 1, wherein the first communication device includes means for periodically checking for optimum operating frequencies and communicating them to the second communication device.

11. In a DS-CDMA communication system having at least a first and a second communication device, a method for providing communication between the first and the second communication devices with optimum reuse of spreading codes and available frequencies, comprising the steps of:

in the first communication device:
transmitting a signal to the second communication device requesting an optimum spreading code and an optimum operating frequency;

in the second communication device:
receiving the signal;
identifying a first operating frequency optimum for the second communication device;

identifying a first spreading code optimum for the second communication device;

transmitting information about the first spreading code and the first operating frequency; and communicating with the first communication device using the first spreading code and the first operating frequency.

12. The method of claim 11, further including the step of:

in the first communication device, identifying a second spreading code optimum for the first communication device.

13. The method of claim 12, further including the step of:

in the first communication device, transmitting the second spreading code.

14. The method of claim 11 further including the step of:

in the first communication device, identifying a second optimum operating frequency for the first communication device.

15. The method of claim 14, further including the step of:

in the first communication device, transmitting the second optimum operating frequency.

16. The method of claim 11, further including the step of:

in the second communication device, receiving the second spreading code and communicating with the first communication device using the second spreading code.

17. The method of claim 11, further including the step of:

periodically updating the first and second spreading codes.

18. The method of claim 17, further including the step of:

the first and the second communication devices communicating the updated spreading codes to each other as they are updated.

19. The method of claim 11, wherein the step of identifying identifies a plurality of spreading codes optimum for the second communication device.

20. The method of claim 19, further including the step of:

in the first communication device, identifying which of the plurality of spreading codes is optimum to communicate with the second communication device.

21. A multi-channel CDMA communication device having a plurality of codes including a control code, comprising:

a receiver for receiving a signal on a control channel and coded with the control code from a communication unit, the signal including a request for an optimum spreading code and an optimum operating frequency;

first means for identifying the optimum operating frequency;

second means for identifying the optimum spreading code;

a transmitter for transmitting the optimum operating frequency and information about the optimum spreading code; and the receiver includes means for receiving signals on the optimum operating frequency and decoding signals spread by the optimum spreading code.

22. The receiver of claim 21, further including an adaptable matched filter.

23. The receiver of claim 21, wherein the first means for identifying includes means for periodically searching for optimum spreading codes.

24. The receiver of claim 21, wherein the second means for identifying includes means for periodically searching for optimum operating frequencies.

* * * * *